United States Patent [19]
Larson et al.

[11] 4,168,914
[45] Sep. 25, 1979

[54] METHOD AND APPARATUS FOR BLENDING FINE AND COHESIVE POWDERS IN A FLUIDIZED BED WITH GAS INJECTION THROUGH BALL VALVES

[75] Inventors: Richard I. Larson; John T. Adomitis, both of Wilmington, N.C.; Thomas G. Beckingham, San Jose, Calif.

[73] Assignee: General Electric Company, San Jose, Calif.

[21] Appl. No.: 803,727

[22] Filed: Jun. 6, 1977

[51] Int. Cl.² ............................................. B01F 13/02
[52] U.S. Cl. ...................................... 366/101; 34/10; 423/261; 423/DIG. 16
[58] Field of Search ............... 366/101, 107, 106, 102, 366/103, 104; 423/261, DIG. 16; 34/10; 222/195, 193

[56] References Cited

U.S. PATENT DOCUMENTS

| | | | |
|---|---|---|---|
| 2,786,280 | 3/1957 | Gishler | 366/101 |
| 3,825,230 | 7/1974 | Frye | 366/104 |
| 3,881,702 | 5/1975 | McIver | 366/107 |
| 4,021,193 | 5/1977 | Waters | 34/57 A |

FOREIGN PATENT DOCUMENTS 900242  4/1959  United Kingdom ............. 366/101

OTHER PUBLICATIONS

Page 56 of Bulletin #123, Utah Engineering Experiment Station, Sixth Printing, Mar. 1970.

*Primary Examiner*—Robert W. Jenkins
*Attorney, Agent, or Firm*—Ivor J. James, Jr.; Samuel E. Turner; Sam E. Laub

[57] ABSTRACT

A mixture of fine and cohesive powders is blended to complete homogeneity in a nuclear-safe bubbling-bed fluidized bed blender having an improved fluidizing grid. The blender includes a generally vertically-oriented slab-shaped, nuclear-safe mixing vessel having a fluidizing grid disposed at one end of the vessel. The fluidizing grid comprises a linear array of generally downwardly-directed, pyramidal-shaped hoppers each having walls converging into a conically-shaped opening. A plurality of ball valves are employed, one such valve being disposed at the bottom of each hopper. The rotary closure member of each of the ball valves includes a first set of gas orifices for directing a flow of fluidizing gas upwardly in a divergent swirl-shaped pattern along the walls of each of the hoppers. In one embodiment a second set of fluidizing gas orifices for directing a flow of fluidizing gas downwardly into the apex of each of the hoppers is also provided. During blending, fluidizing gas is supplied to the first set of orifices, or to a combination of the first and second sets of orifices, in an amount sufficient to cause bubbles of fluidizing gas to rise through the mixture of powders and emerge from the top surface of the powders until a homogeneous blend of powders is achieved.

20 Claims, 8 Drawing Figures

METHOD AND APPARATUS FOR BLENDING FINE AND COHESIVE POWDERS IN A FLUIDIZED BED WITH GAS INJECTION THROUGH BALL VALVES

CROSS REFERENCE TO RELATED INVENTION

The present invention is directed to an improvement over the fluidized bed blender disclosed in a co-pending application of Zenz et al, Ser. No. 803,726, filed June 6, 1977, entitled Method and Apparatus for Blending Powders in a Fluidized Bed, and assigned to the same assignee.

BACKGROUND OF THE INVENTION

1. Field of the Invention

The invention relates to the blending of particulate solids and in particular to a method and apparatus for converting a heterogeneous mixture of fine and cohesive $UO_2$ powders into a homogeneous mixture.

2. Description of the Prior Art

The blending of particulate solids has been accomplished in the past in a variety of ways. Mechanical mixers of several types, such as tumble mixers, ribbon blenders and high shear mixers, have been used, as well as so-called bubbling-bed fluidized bed blenders and spouting bed blenders. In the prior art, $UO_2$ powders have primarily been blended with mechanical tumble-type blenders, such as disclosed in U.S. Pat. No. 3,825,230 to Frye et al. However, problems attendant upon the use of mechanical tumble blenders in general and in particular with the use of mechanical tumble blenders for the blending of $UO_2$ powders brought the development of the bubbling-bed fluidized bed blenders.

The aforementioned Zenz et al application discloses an improved bubbling-bed fluidized bed blender. The Zenz et al blender eliminated the large deadzones encountered in prior art bubbling-bed fluidized bed blenders by providing a fluidizing grid comprising a linear array of pyramidal-shaped hoppers, each hopper converging into a conically-shaped opening and a gas orifice for directing a flow of fluidizing gas downwardly into the bottom of the hopper. The elimination of the dead-zones enabled the Zenz et al blender to meet product homogeneity specifications for powder having an instantaneous flow function of about 4.0 or greater as measured by a Jenike-type flow factor tester. A compaction and build-up problem developed with fine, cohesive $UO_2$ powders having an instantaneous flow function less than about 4.0 during blending in the Zenz et al blender. As used herein, the instantaneous flow function is the relationship between the unconfined yield strength and the consolidating pressures for the particles of powder being blended. The instantaneous flow function and the flow factor tester are more fully described in Bulletin No. 123, Utah Engineering Experimental Station, *Storage and Flow of Solids* by Andrew W. Jenike. Certain types of these fine and cohesive $UO_2$ powders were found to deposit, compact and bridge in the hoppers of the Zenz et al blender. Since $UO_2$ product homogeneity specifications require nearly ideal blending, this build-up in the hoppers of the Zenz et al blender prevented the blender from meeting product homogeneity specifications with $UO_2$ powders having a flow factor less than about 4.0.

A general discussion of the design considerations involved in designing a prior art bubbling-bed fluidized bed blender including a consideration of particle properties, particle size, particle distribution, vessel geometry, superficial gas velocity, and circulation patterns is found in *Fluidization and Particle Fluid Systems* by Frederick A. Zenz and Donald F. Othmer, Reinhold Chemical Engineering Series, Reinhold Publishing Corporation, New York, 1960. Design considerations for possible grid designs are found in *Fluidization* by J. F. Davidson and D. Harrison, Academic Press, London, 1971.

The prior art also discloses spouting bed blenders, having a convergent hopper at the bottom of the blender with a plurality of mixing gas orifices disposed in a circular array at the bottom of the hopper, for example see British Pat. No. 900,242. Although the British patent shows orifices disposed at angles such that jets of mixing air are directed in a swirl pattern along the walls of the converging hopper, and in one embodiment the orifices are included in the closure member of a gate valve, there are differences between the device disclosed in the British patent and that of the present invention. These differences stem from the fact that the British device may be characterized as a spouting bed blender rather than a bubbling-bed fluidized bed blender. Spouting bed blenders employ gas mixing jets of sufficient power and duration to suspend and drive particles through the bed in a continuous stream that spouts from the top of the bed. In the British patent mixing is accomplished by pressure waves so dimensioned that the coarsest particles of the highest specific gravity in the mixture of particles in the mixing vessel are suspended upwardly. Fluidization in a bubbling-bed fluidized bed blender occurs at much lower mixing gas velocities. In fact, it is the lower mixing gas velocity of the bubbling-bed fluidized bed blender that makes it particularly suitable for blending $UO_2$ powders. Spouting bed blenders have not been adopted for the blending of $UO_2$ powders in particular because the violent action of gas jets sufficient to suspend the coarsest particles causes excessive loss of $UO_2$ powder through entrainment with the mixing gas.

In bubbling-bed fluidized bed blenders the fluidizing grid (or gas distributor) at the bottom of the bed exerts a strong influence on the mixing process carried out in the bed. A coarse distributor produces high injection rates of gas at local points which leads to the channeling of gas within the bed. Channeling of gas causes deadzones of stagnant or unfluidized material. Since the gas mixing orifices disclosed in the British patent were intended to be used at much higher gas velocities than those necessary for bubbling-bed fluidized bed blending, channeling of gas and deadzones would occur in the spouting bed blender of the British patent at lower fluidizing gas velocities.

SUMMARY OF THE INVENTION

It is a principal object of the present invention to provide a bubbling-bed fluidized bed blender that is capable of providing a blend of powders approaching ideal homogeneity.

It is another object of the present invention to provide a bubbling-bed fluidized bed blender particularly suited for blending fine and cohesive $UO_2$ powders.

More specifically, it is an object of the present invention to provide a bubbling-bed fluidized bed blender that solves the problem of compaction and build-up of fine and cohesive UO$_2$ powders encountered with previous bubbling-bed fluidized bed blenders.

These and other objects of the invention are carried out by providing a method and apparatus containing the heterogeneous mixture of powders to be blended, preferably UO$_2$ powders, in a verticall-oriented, slab-shaped, nuclear-safe mixing vessel having a fluidizing grid disposed at the bottom of the vessel. The fluidizing grid constructed according to this invention comprises a linear array of generally downwardly-directed, pyramidal-shaped hoppers each having walls converging into a conically-shaped opening. A first set of orifices is provided for directing a plurality of fluidizing gas jets in a circular array about the opening of each of the hoppers. The first set of orifices directs gas upwardly in a divergent swirl-shaped pattern along the walls of each of the hoppers. A plurality of ball valves incorporating the first set of orifices are employed, one such valve being disposed at the bottom of each of the hoppers and each capable of closing the opening in the hopper. A second set of orifices for directing a flow of fluidizing gas downwardly into the bottom of each of the hoppers is also provided in one embodiment. Fluidizing gas is supplied to the first set of orifices, or to the combination of the first and second set of orifices, in an amount sufficient to cause bubbles of fluidizing gas to rise through the mixture of powders throughout the bed and emerge from the top of the powder bed until a homogeneous blend of powders is achieved. If the first set of orifices is used alone, fluidizing gas is supplied to the orifices on a continuous basis and the orifices are sized to provide a flow of fluidizing gas at sonic velocity. When the first and second sets of gas orifices are used together the flow of fluidizing gas to the first set of gas orifices is pulsed to sonic velocity for short periods while the flow of fluidizing gas to the second set of gas orifices is continuous. In either case the action of the first set of gas orifices directing a flow of fluidizing gas along the walls of the hoppers prevents the compaction of fine and cohesive UO$_2$ powders in the bottom of the hopper encountered in prior fluidized bed blenders of this type.

DESCRIPTION OF THE PREFERRED EMBODIMENTS

Figure 1:
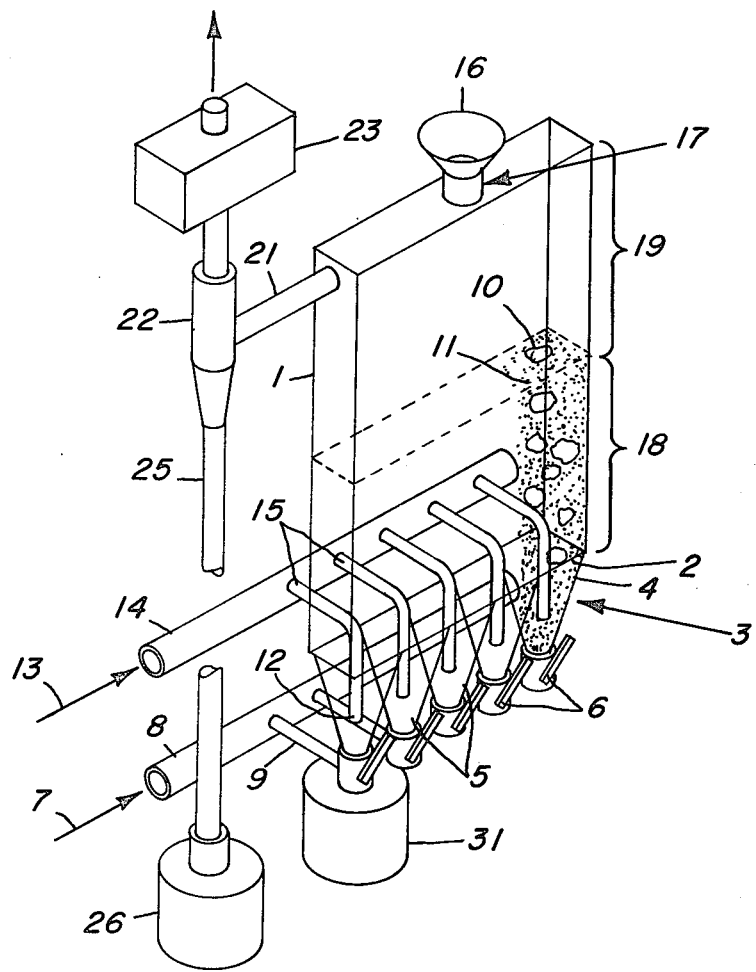
FIG. 1 is a perspective illustration of a bubbling-bed fluidized bed blender constructed according to the present invention.

FIG. 1 illustrates one embodiment of the bubbling-bed fluidized bed blender constructed according to the present invention. The blender comprises a vertically-oriented, rectangular, slab-shaped, nuclear-safe mixing vessel 1 having a fluidizing grid 2 disposed at the bottom of the vessel 1. The fluidizing grid 2 comprises a linear array of generally downwardly-directed pyramidal-shaped hoppers 3, each having walls 4 converging into conically-shaped openings 5. A plurality of valves 6 are employed for discharging blended powders, such as UO$_2$ powders, from the hoppers, one such valve being disposed at the bottom of each hopper. A first set of orifices (not shown in FIG. 1) is incorporated in valve 6, and the set of orifices is connected to a source of fluidizing gas 7, via a common manifold 8 and a plurality of connecting lines 9. The embodiment of FIG. 1 also includes a second set of orifices 12 which direct a flow of fluidizing gas downwardly into the bottom of the hoppers 3, one such orifice being provided for each hopper. A source of fluidizing gas at 13 is connected to each of the orifices 12 by a common manifold 14 and a plurality of blownpipes 15.

The vessel 1 of the bubbling-bed fluidized bed blender is filled through an inlet 16 having a valve 17, such as a butterfly valve, associated therewith for preventing the escape of powders during the blending process. The valve 17 is not shown in detail since it is not part of the present invention and any suitable type of butterfly valve may be employed. The vessel 1 is initially filled to about one half of its height with a mixture of heterogeneous or unblended powders. Thus, the bottom half 18 of vessel 1 serves as a mixing chamber for the vessel while the top half 19 serves as a gas plenum where powders entrained with the fluidizing gas may settle.

The blender of the present invention includes a fluidizing gas off-gas system comprising a fluidizing gas outlet 21 disposed at the top of the gas plenum 19, a cyclone separator 22 connected to receive fluidizing gas from the fluidizing gas outlet 21 and a high efficiency filter 23 connected to receive fluidizing gas from the cyclone separator 22. Gas discharged from the high efficiency filter at 23 is eventually directed to the factory exhaust system. Solids separated out of the cyclone separator 22 fall through a pipe 25 into a container 26 disposed below the cyclone separator 22. The off-gas system is not part of this invention and is indicated only generally in the drawing. Any suitable conventional off-gas system may be employed.

Blending of the particles 11 in this type of blender is effected by bubbles 10 of fluidizing gas emitted from the first set of orifices or from a combination of the first and second sets of orifices. Bubbles of gas rise from the orifices throughout the bed to the top of the bed in wide sweeping zig-zag motions. Once a bubble is formed, adjacent particles flow around its upper portion and down to its lower cavity so that the bubble rises. Particles lying directly above the bubble are forced upwardly as others are pushed aside with some flowing down into the lower portion of the bubble filling its path. Thus, a rising bubble spreads particles radially in all directions. As a given bubble rises particles filling its bottom cavity are packed slightly more tightly than particles immediately outside the bubble's path. The next bubble rising in that general region will follow a path through the less tightly packed particles just to the side of the first bubble's path. Thus, each successive bubble will tend to rise in a different location, blending other particles with the particles previously blended. As more and more bubbles rise through the particle bed, small adjacent bubbles join together forming larger ones. This action, along with the bubbles flowing toward low pressure regions, causes a wide sweeping zigzag bubble motion, creating horizontal as well as vertical convective blending. Bubbles escaping from the top of the particle bed scatter some $UO_2$ powders into the gas plenum 19 at the top of the mixing vessel 1. However, the compressed gas escapes from the particle bed in intermittent puffs. These intermittent puffs of gas allow particles that would normally be entrained in the gas flow an opportunity to fall back into the particle bed rather than being entrained and swept out with the fluidizing gas. It is to be emphasized that in the bubbling-bed fluidized bed blender herein described, although there is the aforementioned circulatory blending, there is actually no mass movement of the particle bed such as that existing in a spouting bed blender.

Once a homogeneous blend of powders is achieved, the bed is discharged from the hoppers in such a manner as to maintain a homogeneous mixture of the powder. This is achieved by maintaining blending conditions throughout the entire discharge sequence, e.g., keeping the bed fluidized during discharge. The homogeneous mixture of powder falls from the open valves 6 so rapidly that bubbles from the residual fluidizing gas injected into the bed are still present substantially throughout the bed during the rapid discharge. In effect this maintains a homogeneous mixture of the powder. One possible method to maintain a homogeneous mixture is to open rapidly one half of the valves (first set) for about one second while maintaining fluidizing gas through the other half of the valves (second set). Then after a suitable delay during which fluidizing gas is injected through all the valves, the second set of valves is opened for about one second while fluidizing gas is injected through the first set of valves. Each set of valves alternatively discharges powder in this manner with the suitable delay period between each discharge until the vessel is empty.

Figure 2:
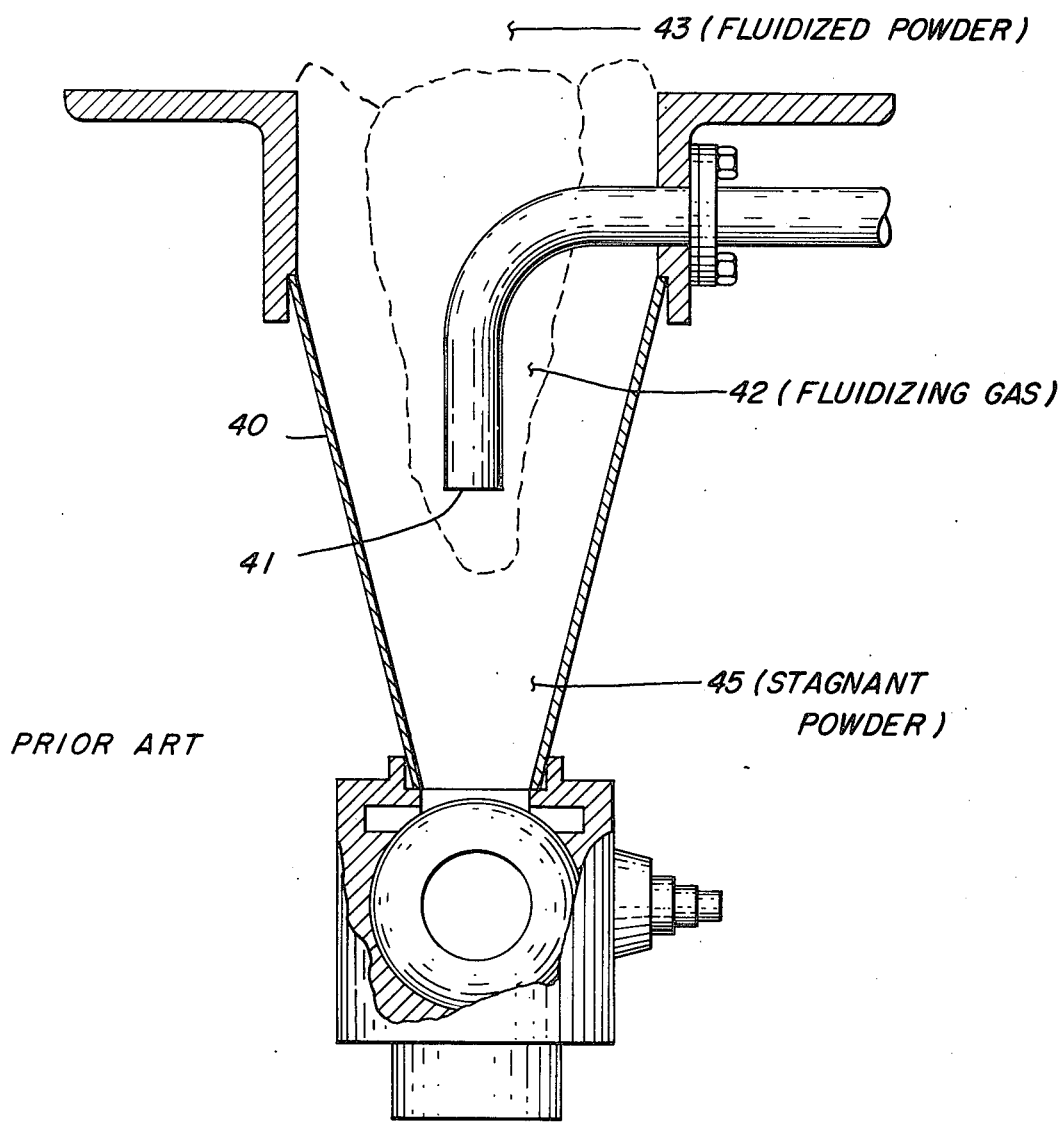
FIG. 2 is a vertical section of one hopper of a prior art bubbling-bed fluidized bed blender utilizing downwardly-directed fluidizing gas orifices and showing the gas flow therein.

Referring now to FIG. 2, a vertical section of one hopper of the fluidized bed blender of the aforementioned Zenz et al application is illustrated during one moment of operation. This blender employs a fluidizing grid including a plurality of hoppers such as the one depicted at 40 arranged in a linear array, with a set of gas orifices, such as the one at 41, directing fluidizing gas downwardly into the bottom of the hopper, one such orifice being provided for each hopper. The volume 42 illustrates a typical fluidizing gas bubble that is repeatedly blown by the jet of fluidizing gas emitted from the orifice 41. The volume 45 adjacent to the volume 42 represents compacted powder that forms when fine and cohesive types of $UO_2$ powder having an instantaneous flow function of less than about 4.0 are blended in the Zenz et al device. Volume 43 above the volume 42 of fluidizing gas shows the particles of powder suspended in the fluidizing gas.

Figure 3:
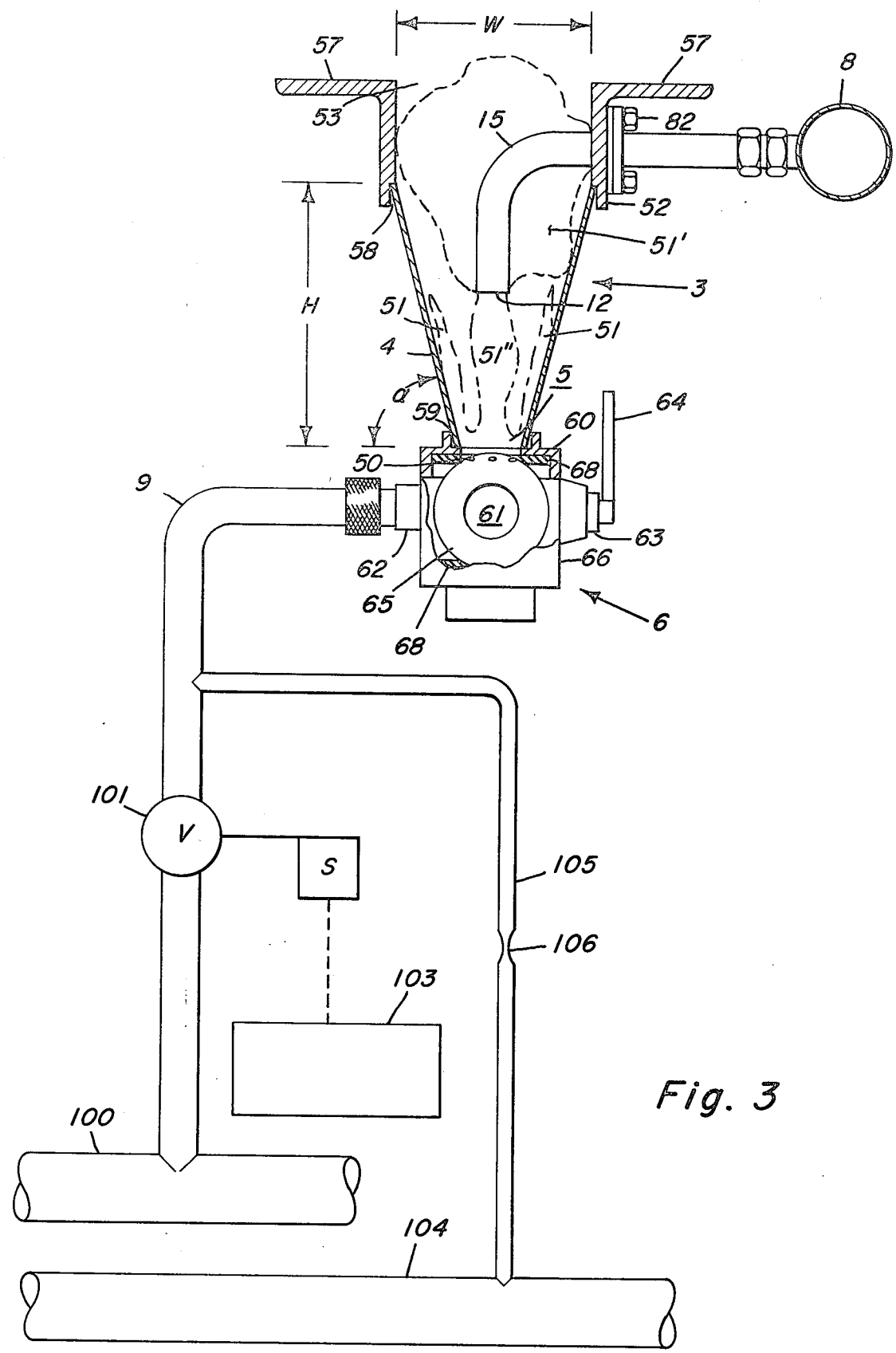
FIG. 3 is a vertical section of one hopper of the bubbling-bed fluidized bed blender of this invention illustrating the gas flow therein and including a schematic of the associated gas supply system.

Referring now to FIG. 1, which has been previously described, and to FIG. 3, there is shown an apparatus of the present invention for carrying out a method of blending a heterogeneous mixture of fine and cohesive powders, preferably $UO_2$ powders. This method comprises the steps of providing the nuclear-safe mixing vessel 1 including the linear array of generally downwardly-directed pyramidal-shaped hoppers 3, each having walls 4 converging into a conically-shaped opening. A mixture of powders such as $UO_2$ powders, to be blended, is supplied to the vessel 1 in amount sufficient to partially fill the vessel, usually to about one half the height of the vessel 1. A first set of fluidizing gas orifices illustrated at 50 in FIG. 3 is disposed in a circular array about the opening 5 of each of the hoppers 3. The first set of fluidizing gas orifices directs a plurality of fluidizing gas jets upwardly in a divergent swirl-shaped pattern along the walls 4 of each hopper 3. The volume 51 in FIG. 3 illustrates where fluidizing gas is directed in each hopper by the first set of orifices. It may be seen from the shape of the volume 51 that compaction and build-up of fine and cohesive powders within and about the hopper 3 (as indicated by the volume 45 in FIG. 2) is substantially eliminated due to fluidizing gas from the first set of orifices. Volume 51' shows a bubble rising from the hopper toward vessel 1. Compaction and build-up of $UO_2$ powders within the entire hopper is prevented by impingement of the first set of orifices upon the possible compaction volume (volume 45 shown in FIG. 2), and by the flow of fluidization gas from the first set of orifices along the walls 4 of the hopper 3 which reduces friction between the $UO_2$ powders and the walls 4 of the hoppers. Volume 53 above gas bubble 51' shows the region where the particles of powder are suspended in the fluidizing gas. Volume 51'' shows fluidizing gas from orifice 12 discussed more fully below.

Referring also to FIG. 3, valves 6 are welded to the bottom of the hoppers 3 at 59. The valves 6 are ball valves having in one embodiment a 1⅜ inch diameter full throat 61. Each valve has an operating lever 64 associated with a valve stem 63 to allow the valves to be individually opened for discharging portions of the fluidized bed blender into transport containers (not shown) disposed below each valve.

Fluidizing gas is supplied to the first set of orifices 50 in an amount sufficient to cause bubbles of fluidizing gas to rise through the mixture of powders and emerge from the top of the powders. Flow of the fluidizing gas through this set of orifices is continued until a homogeneous blend of powders is achieved. More specifically, fluidizing gas is supplied to the first set of orifices in an amount sufficient to provide a superficial gas velocity in the mixing vessel in a range of 1.25 to 2.0 feet per second. A typical blending period for achieving a blend of fine and cohesive powders to nearly ideal quality is about 50 seconds to about 5.5 minutes. To prevent plugging of the first set of orifices 50, the orifices 50 are sized such that the fluidizing gas is emitted therefrom at sonic velocity. Normally, the fludizing gas employed in all of the steps of the present blending method is dry nitrogen or dry air at ambient temperature.

The method of the present invention may further include the step of directing a second set of fluidizing gas orifices 12 downwardly into the opening 5 of the hopper 3. The second set of orifices in the preferred embodiment comprises a single orifice the center of which is positioned along the center line of the pyramidal-shaped portion of the hopper. Fluidizing gas is then supplied to the first and second sets of orifices in a combined amount sufficient to cause bubbles of fluidizing gas to rise throughout the mixture of powders and emerge therefrom until a homogeneous blend of powders is achieved.

In this step of the method, the flow of fluidizing gas to the first set of orifices is pulsed for a short portion of a cycle with the balance of the cycle being a purge flow, and the flow of fluidizing gas to the second set of orifices is continuous. Most of the fluidizing gas being introduced to the mixing vessel during this step of the method is introduced through the second set of orifices. The first set of orifices is periodically pulsed to eliminate compaction and bridging of fine and cohesive powders within the entire volume of the hoppers. It has been determined that it is desirable to pulse the first set of orifices at sonic velocity for a period of one second out of every period of six seconds that the process is run.

Further, to prevent surging or periodic lifting of the bed of powder, all the orifices contained within one hopper are pulsed for one second out of every period of six seconds at the same time and a sequence of randomly pulsing the different hoppers is established. By the term "randomly," as employed in the preceding sentence, it is intended to indicate that the pulsing arrangement is such as to avoid pulsing simultaneously adjacent hoppers in the linear array. Such pulsing would tend to have the effect of causing surging or periodic lifting of the bed of powders, preventing optimum operation of the apparatus.

Figure 4:
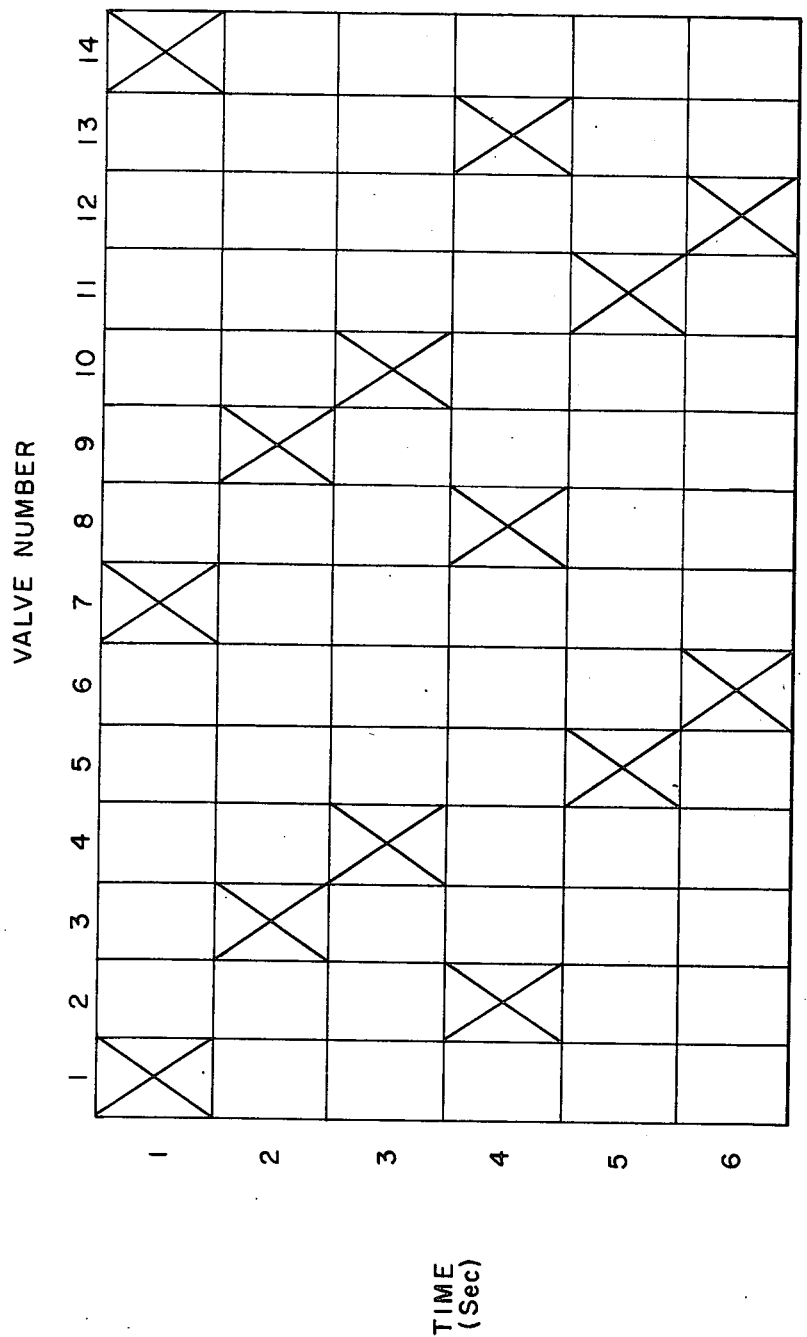
FIG. 4 is a chart illustrating the order of pulsing of orifices in a first set of orifices employed in this invention.

One particular type of pulsing arrangement which is embraced by the term "randomly" is best illustrated in FIG. 4 which indicates the order of pulsing of the groups comprising a first set of orifices providing fluidizing gas to a linear array of fourteen hoppers. In this figure, the valves which are associated with the fourteen hoppers and which include the groups of orifices of the first set of orifices are numbered along the abscissa from 1 through 14 and the time in seconds is indicated on the ordinate. The X's in the chart shown in FIG. 4 indicate the groups of orifices associated with particular valves which are pulsed during each second of the six-second cycle involved. Thus, referring to FIG. 4, it can be seen that during the first second, valves 1, 7 and 14, which are separate from each other, are pulsed. During the second second, valves 3 and 9, which are also separate from one another, are pulsed. During the following four seconds, valves 4 and 10 are pulsed, then valves 2, 8 and 13 are pulsed, then valves 5 and 11 are pulsed and finally valves 6 and 12 are pulsed, thereby completing the cycle which results in pulsing of fluidizing gas through the groups of orifices in all fourteen valves. It will be understood that thereafter the sequence is repeated, beginning again with valves 1, 7 and 14.

In FIG. 3 the means for pulsing the orifices 50 in a ball 65 of a ball valve 6 is shown. A pulse manifold 100 supplies sufficient gas pressure through electrically operated solenoid valve 101 in line 9 to create a sonic flow condition (pulsing) from the eight orifices 50. This solenoid valve 101 is operated by a programmable controller 103 to provide the timing for pulsing as dicussed above with reference to FIG. 4. A similar arrangement has other solenoid valves regulating the supply of fluidizing gas to the ball valves orifices for the other hoppers in the linear array. During the time the orifices 50 are not being pulsed, a purge gas flow prevents back flow of gas and/or solids into the orifices 50. The purge gas flows from manifold 104 into flow line 105 through orifice plate 106 to line 9 and orifices 50. This flow is negligible during the pulse period because the high pressure through valve 101 and line 9 stops flow from flow line 105 through line 9.

Figure 5:
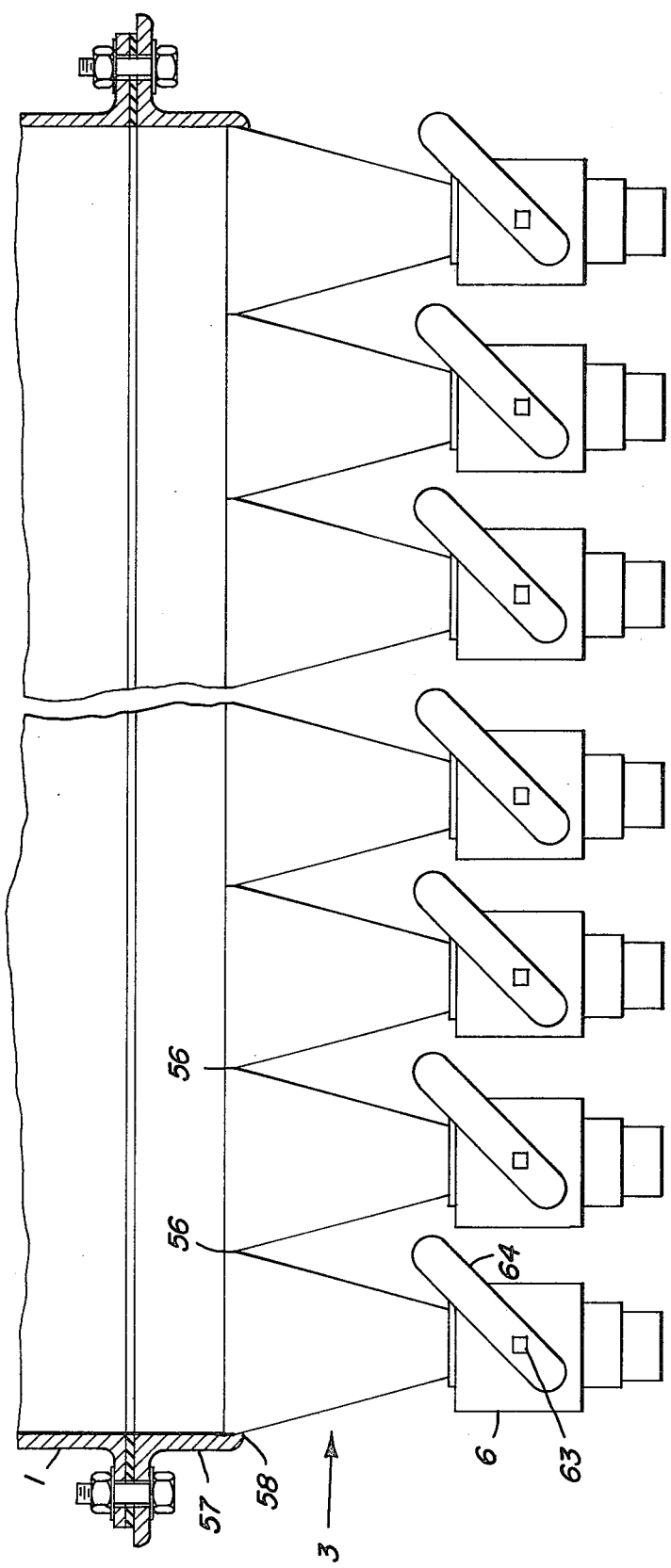
FIG. 5 is a view of a fluidization grid of a bubbling-bed fluidized bed blender constructed according to this invention.

Referring now to FIG. 5, which shows further details of the fluidized bed blender, it may be seen that the hoppers 3 are welded to adjacent hoppers at 56 and to a rectangular transition piece 57 at 58 to form a linear array. The transition piece 57 is connected to the bottom of the mixing vessel 1 in any suitable fashion, for example by bolts. In a preferred embodiment, to insure a nuclear-safe vessel 1 for blending $UO_2$ powder enriched with the U-235 isotope in amounts from about 0.7% up to 4.0% by weight, the vessel 1 has a maximum width of about five inches corresponding to the top dimensions (width and length) of each hopper. The transition piece 57 is of L-shaped cross-section and forms a central rectangular opening corresponding in size to the tops of the array of hoppers 3. The transition piece thus surrounds the hoppers and is welded thereto as previously indicated.

Referring now to FIGS. 3, 6, 7 and 8, the rotary closure member 65 of each ball valve 6, held between gaskets 68, is provided with a group of orifices 50 disposed in a generally circular array. Fluidizing gas flows into the body 66 of the valve 6 and into the throat 61 of the closure member 65 and through the orifices 50 into the bottom of the hopper 3. Together the groups of orifices of the several valves utilized with the linear array of hoppers comprise the first set of orifices, which feed fluidizing gas to the hopper when the ball valves are in the closed position shown in FIG. 3. When a valve is turned by its lever 64 to the open or discharge position, its throat 61 is brought into alignment with the bottom of the hopper and the orifices 50 are moved to a position out of communication with the hopper.

Figure 6:
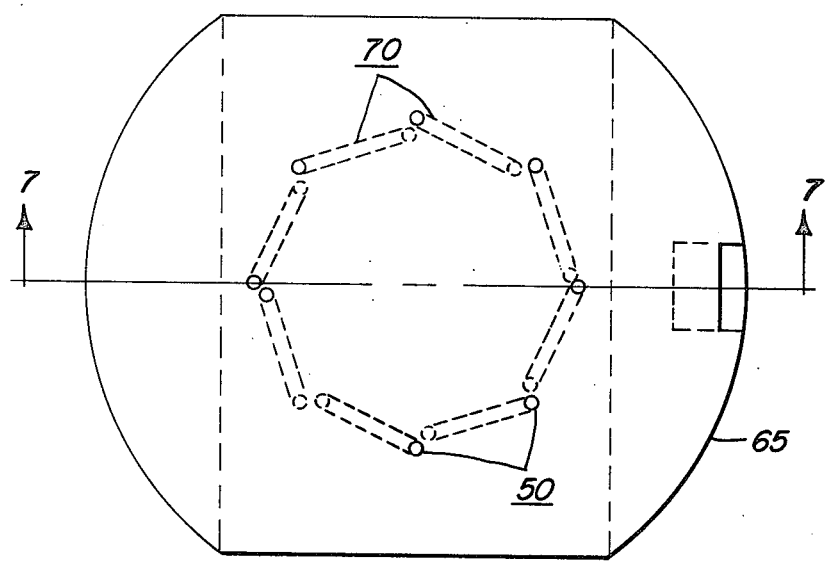
FIG. 6 is a top view of a rotary closure member for a ball valve incorporating a first set of fluidizing gas orifices of the present invention.
Figure 8:
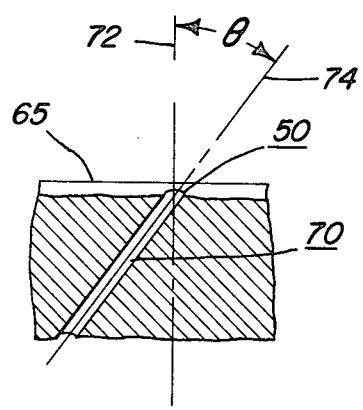
FIG. 8 is a partial section of the rotary closure member illustrated in FIG. 6 taken along line 8—8 in FIG. 7.
Figure 7:
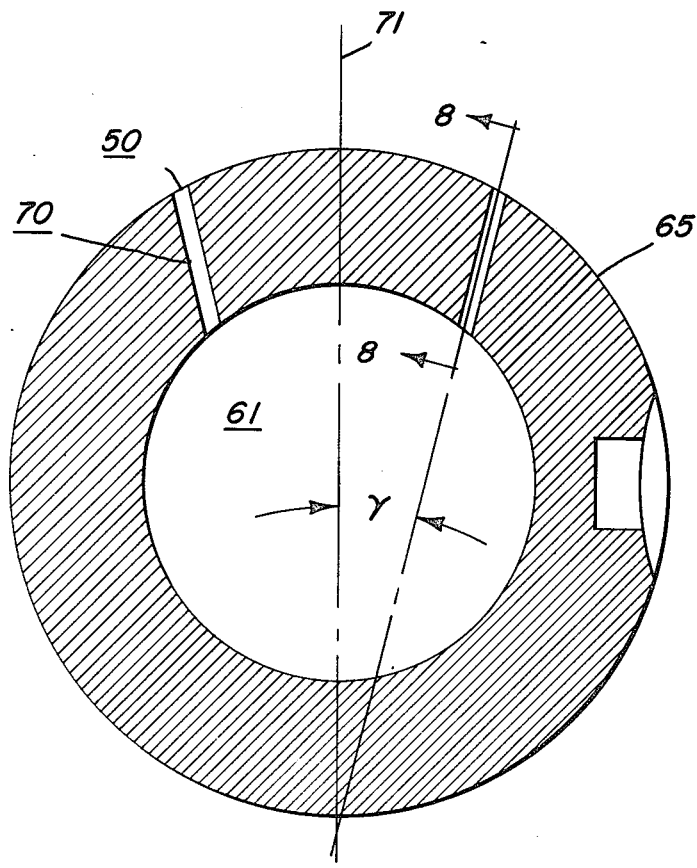
FIG. 7 is a vertical section of the rotary closure member illustrated in FIG. 6 taken along line 7—7 in FIG. 6.

As best shown in FIGS. 6, 7 and 8, the first set of orifices is provided by drilling a plurality of gas passages 70 in each rotary closure member 65. The orifices 50 formed by the passages 70 at the outer surface of the closure member 64 are disposed in a circular array. The gas passages 70 extend to the throat 61 and are inclined at an angle $\gamma$ with respect to a line 71 which coincides with the central axis of the hopper (shown in FIG. 7). The passages 70 are also inclined at an angle $\theta$ (shown in FIG. 8) with respect to a line 72 normal to the surface of the rotary closure member 65 at the orifice 50. For hoppers having the dimensions set forth above, the angle $\gamma$ in FIG. 7 is the angle (about 15°) between the line 71 and the centerline of passage 70. The angle $\theta$ (about 30°) is formed between the normal line 72 and a line 74 passing axially through the bore of the gas passage 70, shown in FIG. 8. This location of the passages 70 prevents plugging of the passages 70 during loading of the blender as powder charged to the blender does not enter passages 70.

Referring now to FIG. 8, a detailed view of one of the drilled gas passages 70 is illustrated. The passage 70 is 0.0625±0.0005 inch in diameter for a hopper having about a 1.5 inch diameter outlet. A total of eight passages are provided in each rotary closure member 65 as shown in FIG. 6. The orifices 50 are sized so that when the full flow of fluidizing gas is passed therethrough in an amount sufficient to provide a superficial velocity in the mixing vessel 1 in a range of 1.25 to 2.0 feet/second sonic flow is achieved in the orifices.

Referring again to FIG. 3, a second set of fluidizing gas orifices 12 is also provided. Each orifice is disposed at the end of elbow-shaped blowpipes 15 which direct fluidizing gas jets downwardly into the bottom of each hopper 3. The blowpipes 15 are bolted to the transition piece 57 at 82 and are removably connected to the manifold 8 in a T-connection so that different blowpipes having different orifice sizes may be substituted, if desired. The size of the orifices 12 is normally in a range of 5/16 to ⅜ of an inch in diameter. This is sufficient to blow fluidizing gas bubbles, in a column of $UO_2$ powders about five inches high, of approximately 2½ inches in diameter, when dry nitrogen or dry air at ambient temperature and 3 to 4 psi is used as a fluidizing gas. In the preferred embodiment of this invention the mixing vessel 1 has a maximum width, indicated by W in FIG. 3, of about 5 inches and the hoppers 3 are arranged as shown, in a single linear array. The top of each hopper 3 has a five-inch square cross section, indicated at 52 in FIG. 3. Each hopper tapers from this cross section at the top to a circular cross section about 1½ inches in diameter at the bottom adjacent the first set of orifices 50. In one specific embodiment the height, indicated at H in FIG. 3, of each hopper is about 6.53 inches and the walls 4 of the hopper form an angle, indicated at $\alpha$ in FIG. 3, of 75° with the horizontal.

When only the first set of orifices is employed, fluidizing gas is supplied to this set of orifices in a continuous manner in an amount sufficient to cause bubbles of fluidizing gas to rise through the mixture of powders and emerge from the top of the powder until a homogeneous blend of powder is achieved. As indicated earlier the fluidizing gas so supplied has a velocity in the range of 1.25 to 2.0 feet/second.

When both the first and second sets of orifices are employed, the primary flow of fluidizing gas is supplied in a continuous manner through the second set of orifices and additional fluidizing gas is supplied in a randomly pulsed manner, as described above through the first set of orifices. The combined gas flow through the two sets of orifices is in an amount sufficient to cause bubbles of fluidizing gas to rise through the mixture of powders and emerge at the top surface thereof until a homogeneous blend of powder is acieved. The combined gas flow has a velocity in the range of 1.25 to 2.0 feet/second.

Other forms, embodiments and applications of the invention may occur to those skilled in the art and it is intended by the appended claims to cover all such modifications coming within the proper scope of this invention.

What is claimed is:

1. A fluidized bed blender suitable for blending powders including a mixture of fine and cohesive powders comprising:
   (a) a vertically-oriented mixing vessel;
   (b) a fluidizing grid disposed at the bottom of said vessel; said fluidizing grid comprising:
      (i) a linear array of pyramidal-shaped hoppers, each hopper having walls converging into a conically-shaped opening, and
      (ii) a first set of orifices arranged in a circular array about the opening of each of said hoppers, said first set of orifices being capable of receiving a fluidizing gas and directing fluidizing jets of said gas upwardly in a divergent swirl pattern along the walls of each of said hoppers;
   (c) means for supplying fluidizing gas to said orifices in an amount sufficient to cause bubbles of fluidizing gas to rise through said mixture of powders and emerge from the top surface of said powders until a homogeneous blend of said powders is achieved; and
   (d) means for purging said orifices when said orifices do not receive fluidizing gas.

2. A fluidized bed blender of claim 1, further including a plurality of ball valves, one of said ball valves being disposed at the opening of each of said hoppers, and said ball valves including said first set of orifices.

3. A fluidized bed blender of claim 2, wherein each of said ball valves includes a rotary ball-shaped closure member, each of said ball-shaped closure members having a plurality of passages therein to provide said first set of orifices when said ball valves are in a closed position with respect to the opening of said hopper.

4. A fluidized bed blender of claim 3 in which each of the passages of said plurality of passages is inclined at an angle of about 30° with respect to a line normal to the surface of the closure member at the orifice so as to prevent plugging of the passages during loading of said blender.

5. A fluidized bed blender of claim 1, wherein said means for supplying fluidized gas is adapted to receive a supply of dry nitrogen at ambient temperature.

6. A fluidized bed blender of claim 1, wherein said fluidizing gas is supplied in an amount sufficient to provide a superficial gas velocity in the mixing vessel in a range of 1.25 to 2.0 feet/second during fluidized bed blending.

7. A fluidized bed blender of claim 6, wherein said first set of orifices is sized to provide a flow of fluidizing gas at sonic velocity therethrough.

8. A fluidizing bed blender of claim 1, further including:
   (a) a second set of orifices positioned for directing a flow of fluidizing gas downwardly into the bottom of each of said hoppers;
   (b) said means for supplying fluidizing gas being connected to said second set of orifices to supply a combined amount of fluidizing gas to said first and second sets of orifices sufficient to cause bubbles of fluidizing gas to rise through said mixture of powders and emerge from the top surface thereof.

9. A fluidized bed blender of claim 8, wherein the flow of fluidizing gas to said second set of orifices is continuous and the flow of fluidizing gas to said first set of orifices is pulsed.

10. A fluidized bed blender of claim 9, wherein the combined flow of fluidizing gas to said first and second sets of orifices is in an amount sufficient to provide a superficial gas velocity in the mixing vessel in a range of 1.25 to 2.0 feet/second during fluidized bed blending.

11. A fluidized bed blender of claim 8, further including means for pulsing the fluidizing gas to said first set of orifices to sonic velocity for a period of one second in every six seconds.

12. A fluidized bed blender of claim 8, wherein:
   (a) said first set of orifices comprises a plurality of groups of orifices, each of said groups of orifices being disposed about the opening of a corresponding one of said hoppers; and
   (b) means for pulsing the flow of fluidizing gas to said groups of orifices to sonic velocity randomly among said groups for a period of one second in every six seconds.

13. A fluidized bed blender of claim 1 wherein said means for supplying fluidized gas is adapted to receive a supply of dry air at ambient temperature.

14. A method of blending a heterogeneous mixture of powders including a mixture of fine and cohesive powders comprising the steps of:

(a) providing a mixing vessel zone including a linear array of pyramidal-shaped hoppers, each having walls converging into conically-shaped openings;

(b) supplying said mixture of powders to be blended to said vessel in an amount sufficient to partially fill said vessel;

(c) directing a first set of fluidizing gas jets positioned to feed fluidizing gas at sonic flow to said mixing vessel zone in a circular array about the opening of each of said hoppers, said first set of fluidizing gas jets being directed upwardly in a divergent swirl-shaped pattern along the walls of each of said hoppers; and (d) supplying fluidizing gas to said first set of fluidizing gas jets in an amount sufficient to produce sonic flow and to cause bubbles of fluidizing gas to rise through said mixture of powders and emerge from the top of said powders until a homogeneous blend of said powders is achieved.

15. The method of claim 14, further including the steps of:

(a) directing a second set of fluidizing gas jets downwardly into the bottom of each of said hoppers; and (b) supplying fluidizing gas to said first and second sets of fluidizing gas jets in a combined amount sufficient to cause bubbles of fluidizing gas to rise through said mixture of powders and emerge from the top surface thereof until a homogeneous blend of said powders is achieved.

16. The method of claim 15, further including the steps of:

(a) pulsing the flow of fluidizing gas to said first set of fluidizing gas jets to provide sonic flow for a period of one second in every six seconds;

(b) providing a continuous flow of a purging gas to said first set of fluidizing gas jets for the remaining five seconds of said period; and (c) providing a continuous flow of fluidizing gas to said second set of fluidizing gas jets.

17. The method according to claim 14 in which the fluidizing gas is comprised of dry nitrogen.

18. The method according to claim 14 in which the powders are comprised of uranium dioxide.

19. The method according to claim 14 in which there is practiced the additional step of discharging said mixture of powders from said mixing vessel zone while supplying said fluidizing gas in an amount sufficient to cause bubbles of fluidizing gas to rise through the portion of the mixture of powders remaining in said mixing vessel zone.

20. The method of claim 14 in which the fluidizing gas is comprised of dry air.

* * * * *